United States Patent

[11] 3,615,562

| [72] | Inventors | Sol E. Harrison<br>Huntington Valley, Pa.;<br>Joel Goldmacher, Cranberry, N.J. |
|---|---|---|
| [21] | Appl. No. | 724,233 |
| [22] | Filed | Apr. 25, 1968 |
| [45] | Patented | Oct. 26, 1971 |
| [73] | Assignee | RCA Corporation |

[54] CYANINE DYE PHOTOGRAPHIC FILM
6 Claims, No Drawings

| [52] | U.S. Cl. | 96/89 |
|---|---|---|
| [51] | Int. Cl. | G03c 1/72 |
| [50] | Field of Search | 96/89, 102 |

[56] References Cited
UNITED STATES PATENTS

| 2,078,233 | 4/1937 | Brooker | 96/102 |
|---|---|---|---|
| 2,177,401 | 10/1939 | Brooker | 96/102 x |
| 3,102,027 | 8/1963 | Sprague et al. | 96/47 |
| 3,104,973 | 9/1963 | Sprague et al. | 96/89 X |
| 3,477,850 | 11/1969 | Berman | 96/89 X |

OTHER REFERENCES

Kosar, " Light Sensitive Systems," Wiley & Sons, New York, 1966, pp. 387, 393– 396.

*Primary Examiner*—Norman G. Torchin
*Assistant Examiner*—John Winkelman
*Attorney*—Glenn H. Bruestle ABSTRACT: A nonsilver direct printout photographic film comprises, in a plastic binder, a photobleachable merocyanine or cyanine dye and molecular oxygen with which the dye irreversably reacts.

CYANINE DYE PHOTOGRAPHIC FILM

BACKGROUND OF THE INVENTION

This invention relates to nonsilver direct printout photographic film of a type especially useful as a computer storage medium and as a video recording medium.

Prior art photographic films make use of cyanine dyes in combination with other materials, such as, cyanine dye bases in silver emulsion type films. These films generally require developing after exposure to light.

Other prior art films, for example, those disclosed in U.S. Pat. Nos. 3,102,810 and 3,342,603, issued to R.H. Sprague, et al., do not require developing of the film after exposure to light and provide a direct printout film. The films disclosed in these patents comprise cyanine dye bases, which are defined therein as dequaternized cyanine dyes, in combination with an activator consisting of an organic halogen compound. The film disclosed in U.S. Pat. No. 3,102,810 also includes either a leuco base or a carbinol base of a triphenylmethane dye or a diphenylmethane dye. The film disclosed in U.S. Pat. No. 3,342,603 also includes an organic sulfide coactivator. These prior art films have two disadvantages. One disadvantage is that generally, the halogen compound used to activate the dye volatilizes with time and therefore limits the shelf life of the film. A second disadvantage is due to the fact that these prior art films depend upon a free radical reaction for production of an image. The free radicals are provided by the interaction of light with the organic halogen compound included in the film. Due to the fact that free radical reactions are essentially uncontrollable and may be likened to a chain reaction, poor resolution of the desired image results due to the spreading effect of this uncontrollable reaction.

In contrast to these prior art films as described above, the novel film disclosed herein provides for a direct printout image on a film which is free of volatile components which may otherwise limit the shelf life of the film. In addition, the novel film does not depend upon a free radical reaction for printing out the image upon exposure to light, thus resulting in a higher resolution image as compared to the aforementioned prior art films.

SUMMARY OF THE INVENTION

A direct printout photosensitive film comprises a cyanine dye and/or a merocyanine dye and absorbed oxygen dispersed in a plastic binder.

DESCRIPTION OF THE PREFERRED EMBODIMENTS

In its simplest form, the photosensitive film comprises the following:
a. one or more dyes of the cyanine or merocyanine type;
b. a plastic binder or carrier which preferably supports the dye as a dispersion or a solution throughout the binder to provide either a self-supporting film or a coating mixture to be coated on a supporting base;
c. absorbed oxygen dispersed throughout the binder.
Each of the above components and how they cooperate with each other to provide the novel photosensitive film will now be considered in greater detail.
a. Cyanine or merocyanine dyes The cyanine dyes which are useful in the novel photosensitive film are those represented by the general formula

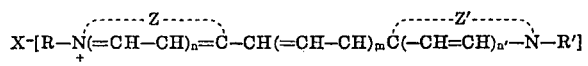

wherein R, and R' represent alkyl, aryl or aralkyl radicals, and may be the same as one another or different from one another; X is a monovalent anion; Z and Z' are nonmetallic atoms necessary to complete a 5 or 6 membered heterocyclic nucleus, such as heterocyclic nuclei selected from the group consisting of derivatives of the following families; thiazole, benzothiazole, napthothiazole, oxazole, benzoxazole, napthoxazole, selenazole, banzoselenazole, napthoselenazole, thiazoline, quinoline, isoquinoline, benzimidazole, indolenine, and pyridine, and Z and Z' may be the same as or different from one another; $n$ and $n'$ may be 0 or 1 and may have the same or different values; m is an integer from 0 to 4.

An example of a dye typical of this class is 1,1'-diethyl-2,2'-carbocyanine chloride. This dye can be represented by the structural formula

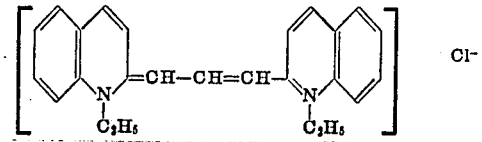

The merocyanine dyes which are useful in the novel photosensitive film are those represented by the general formula

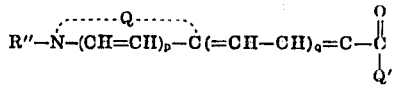

wherein R" is an alkyl, aryl or aralkyl radical; $q$ is an integer from 1 to 4; $p$ is either 0 or 1; and Q and Q' are nonmetallic atoms necessary to complete a 5 or 6 membered heterocyclic nucleus, such as a heterocyclic nucleus selected from the group consisting of derivatives of the following families; thiazole, benzothiazole, napthothiazole, oxazole, benzoxazole, napthoxazole, selenazole, benzoselenazole, napthoselenazole, thiazoline, quinoline, isoquinoline, benzimidazole, indolenine, and pyridine.

An example of a dye typical of this class is 5-[3-ethyl-benzthiazolylidene ethylidene] (-3-ethylrhodanine) which has the structural formula

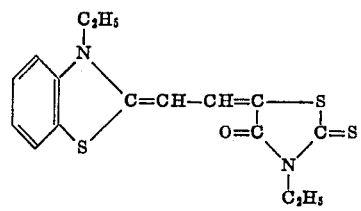

The cyanines and merocyanines may be present in the film either singly or mixed with each other or with other cyanines and merocyaninines respectively.

It can be noted that the dyes useful in this invention are in their colored state in the virgin film and are bleached upon exposure to light. It may also be noted that the cyanine dyes are ionic in nature while the merocyanines are neutral molecules.

Other examples of useful cyanine and merocyanine dyes are given in table I

| Cyanines | Merocyanines |
| --- | --- |
| 2-bis[3-ethylthiazolinyl] monomethine cyanine iodide. | 5-(1,3-diethyl-2(3H)-benzimidazol-ylidene-ethylidene)-3-ethyl-rhodanine. |
| 2-bis[3-ethyl-4-methylthiazolyl] trimethine cyanine iodide. | 5-p-dimethylaminobenzylidene-3-ethyl-1-phenyl-2-thio-hydantoin. |
| 2-bis[3-ethyl-4,5 diphenylthiazolyl] pentamethine cyanine chloride. | 4-[(1-methyl-4-(1H) pyridylidene)-2,4-hexadienylidene]-3-phenyl-5-(4H)-isoxazolone. |
| 2-bis[3-ethylbenzoselenazolyl] trimethine cyanine chloride. | 2-(paradimethylaminostryryl)-benzthiazole. |
| 2-bis[3-ethylnaphthoxazolyl] trimethine cyanine iodide. | | b. The plastic binders useful in the novel film are generally the same as those used as binders in prior art photosensitive films and include for example cellulose and cellulose derivatives, polystyrene, polyacrylates, polymethacrylates, polyamides, polycarbonate, polyesters, polyvinylchloride, polyvinylalcohol, copolymers of polyvinyl chloride and polyvinylacetate.

It is preferable that the plastic be essentially transparent to visible light in the thickness used in the film so as to provide for maximum possible contrast ratios upon photobleaching of the dye.

It is also preferred to use a binder that is compatible with the particular dyes employed. By this it is meant that the dyes in any given film should be soluble in the binder so as to provide a uniform density of the dye material throughout the film. It is also desirable that the binder be capable of absorbing a quantity of oxygen sufficient to react with all the dye present in the binder so as to completely bleach the dye upon exposure to light. To insure completeness of reaction it is preferred that a molar excess of available oxygen be present in the film.

In order to obtain a sensitive high contrast film, the quantity of dye admixed with the binder should provide an essentially opaque film but should not be of such a concentration as to either require extended exposure to cause bleaching of the dye or require more oxygen than available in the film for bleaching of the dye.

Concentrations of about 1–5 weight percent of dye in the binder has been found to be desirable and concentrations of about 1.5 to 2.5 percent are preferred.

The novel film differs from the aforementioned prior art films in that it is essentially free of materials which cause free radical reactions with the dye upon exposure to light. The novel film operates by reaction of the dye with the absorbed oxygen in the binder. This oxidation irreversably decomposes the colored dye and causes the formation of transparent products. This oxidation process is extremely slow under normal room temperature, dark conditions, such that the film is substantially stable under these conditions. Upon exposure to exciting light, it is believed that the dye is raised to an excited energy state wherein it becomes substantially more reactive than in its ground state. The excited (sensitized) dye then reacts with the available oxygen and decomposes to form colorless reaction products. This photoinduced oxidation does not depend upon or involve any free radical reactions.

The resolution of the film is exceedingly high due to the fact that the reaction is essentially molecular in nature and does not tend to spread. The practical limits to resolution are that of the light source used to impart an image on the film. For example, if one desires to place digital information on the film in as high a packing or bit density as possible, it is preferable to use a focused laser beam for writing in this information as such a beam can be focused to a spot size in about the same order of magnitude as the wavelength of the beam.

In a film of a given thickness and a given concentration of dye and oxygen, the degree of bleaching of the dye in the film may be controlled by modulating the intensity and/or the dwell time of the sensitizing light upon the film. A continuous gray scale can thereby be obtained. The degree of bleaching of the dye may be discussed in terms of optical density of the film where optical density is the logarithim of the reciprocal of the fraction of light transmitted through the film. The change in optical density of the film is a function of the total light energy absorbed per square centimeter by the film. The greater the amount of energy absorbed, the greater will be the change in optical density due to bleaching until a time when further bleaching cannot occur. Such a limit in bleaching can occur either occur either due to the lack of oxygen necessary for further oxidation of the dye or due to the complete reaction of the dye in the film.

Generally, to obtain an optical density change equal to one, that is, an increase in light transmission at the wavelength of the absorption peak of the dye equal to a factor of 10, requires an energy density on the surface of the film in the order of 0.1 joules per square centimeter. Therefore, if one uses a 10–100 miliwatt laser focused to a one micron spot on the film, a change in optical density equal to one can take place in a 100–10 nanosecond period, respectively. Under these conditions, it is possible to write information on the film in a digital method at a 5 to 50 megacycle rate. If ordinary light sources, (that is excluding lasers) are used, information can be recorded as in ordinary photographic techniques but at a slower rate. The slower rate is due to the fact that the energy density obtainable with an ordinary light source is substantially less than that obtainable with a laser.

The change in optical density obtainable with a given light source is a function of the quantum efficiency of the particular dye or dyes in the film. This is, it is a function of the number of molecules of the dye that are bleached for every photon of light absorbed. It is therefore generally preferable to choose a dye having a high quantum efficiency. Example of preferred dyes having high quantum efficiency are the merocyanine dyes, 5-[3-ethylbenzthiazolylidene ethylidene] (-3-ethylrhodanine) and 5-[3-methylthiazolylidene ethylidene]-3-ethyl-2-thio-2:4-oxazoledione.

The following are specific examples for the preparation of the novel photosensitive films.

EXAMPLE 1

0.15 grams of 5-[3-methylthiazolyidene ethylidene]-3-ethyl-2-thio-2:4-oxazoledione and 7.5 grams of a polycarbonate polymer such as Lexan are dissolved in 100 to 150 milliliters of chloroform. Films about 0.001-inch thick are obtained by dipping a precleaned glass slide into the solution, removing the slide very slowly, and allowing the solvent to evaporate in air. Oxygen is entrapped in the film during the process.

EXAMPLE 2

0.15 grams of 5-[3-ehtylbenzthiazolylidene ethylidene] (-3-ethylrhodanine) and 7.5 grams of polystyrene (molecular weight about 200,000) are dissolved in 100 to 150 milliliters of toluene. Films are formed on a glass slide in the same manner as indicated in example 1.

EXAMPLE 3

0.15 grams of pinacyanol chloride and 6 grams of polyvinyl alcohol are dissolved in 100 to 150 milliliters of a one to one water ethanol mixture. The solution is coated on a "Mylar" (polyethylene terephthalate) base and the solvent is allowed to evaporate to form the desired film.

EXAMPLE 4

0.15 grams of the dye 1,1'-diethyl-4,4' carbocyanine iodide and 10 grams of an alcohol soluble butyrate polymer are dissolved in 100 to 150 milliliters of methanol. Films are formed from this solution in the same manner as described in example 1.

Where it is desired to form a self-supporting film, one can either start with a more concentrated solution of the binder and the dye in a solvent or alternatively cast the films by repeated evaporation of the solvent from the surface of a temporary support and then peel the film from the support when the desired thickness of self-supporting film is obtained. It is desirable to aerate the dye-binder solution with oxygen prior to forming the film so as to insure maximum oxygen concentration in the film formed therefrom.

We claim:

1. An irreversible direct printout photobleachable film consisting essentially of a cyanine dye and/or a merocyanine dye and absorbed oxygen in an organic polymeric binder, the concentration of said dye in said binder being from 1 to 5 weight percent, and the quantity of absorbed oxygen being sufficient to completely oxidize said dye to form transparent oxidation products and wherein said dye is a merocyanine dye selected from
   5-[3-ethylbenzthiazolyidene ethylidene]-3-ethylrhodanine and
   5-[3-methylthiazoylidene ethylidene]-3-ethyl-2-thio-2,4-oxazoledione.

2. The film described in claim 1 wherein said dye is 5-[3-ethylbenzthizoylidene ethylidene]-3-ethylrhodanine.

3. The film described in claim 1 wherein said dye is 5-[3-methylthiazolylidene ethylidene ]-3-ethyl-2 thio 2,4 oxazoledione.

4. The film described in claim 1 wherein the concentration of said dye in said polymeric binder is about 2 weight percent.

5. The film described in claim 1 wherein said dye is completely soluble in said polymeric binder.

6. The film described in claim 1 wherein said polymeric binder containing said dye and said absorbed oxygen is a thin coating upon a support.